N. Warlick,
Horseshoeing Apparatus.
N° 11,624. Patented Aug. 29, 1854.
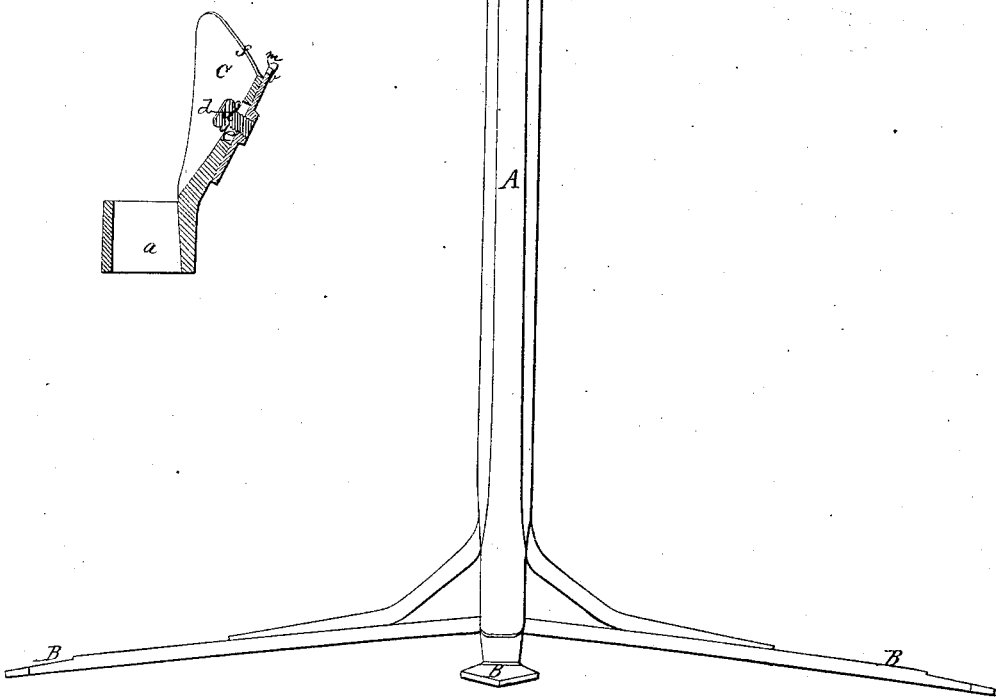

UNITED STATES PATENT OFFICE.

NOAH WARLICK, OF LAFAYETTE, ALABAMA.

IMPROVED HORSESHOEING APPARATUS.

Specification forming part of Letters Patent No. 11,624, dated August 29, 1851.

*To all whom it may concern:*

Be it known that I, NOAH WARLICK, of Lafayette, in the county of Chambers and State of Alabama, have invented a new and useful Improvement in Horseshoeing Apparatus; and I do hereby declare that the following is a full, clear, and exact description of the construction and operation of the same, reference being had to the annexed drawings, forming part of this specification, in which—

Figure 1 is an elevation of the apparatus. Fig. 2 is a section of head on line $x\,x$ of Fig. 1.

Similar characters of reference denote the same part.

The nature of my invention consists in the employment of a peculiar adjustable rest, hereinafter to be described, for the support of the horse's foot during the operation of shoeing.

To enable others skilled in the art to make and use my invention, I will proceed to describe its construction and operation.

In the drawings, A is a standard maintained in a vertical position by the branches B, or in any other suitable manner. Upon this standard, and held by the socket $a$, passing over the standard, is the head-piece C, having its upper edge hollowed out to receive the horse's hoof. On this head-piece is the adjustable serrated slide $b$, held by the screw $d$, which, passing through the slot $e$ of the head, admits of securing the slide in any desired position to which it may be moved.

The object of this apparatus is to firmly hold the horse's foot during the operation of shoeing.

The operation is as follows: The slide $b$ is adjusted by the screw $d$ so as to give any desired amount of protrusion of its serrated edge above the upper edge, $f$, of the head-piece, and the horse's hoof rested upon the said serrated edge during the operation of fitting the shoe, paring the hoof, and fastening the shoe to the hoof, the serrated edge of the slide preventing the slipping of the hoof from the head-piece.

The use of this support is of great importance to the operator, as, instead of holding the horse's hoof between his knees and supporting its entire weight, he is enabled to devote all his attention to the adjustment of the shoe and the keeping of the horse quiet. The adjustable slide, by which the amount of protrusion of the teeth $m$ may be governed by the size of the hoof operated upon, places this apparatus above an ordinary support on which teeth may be constructed for the prevention of slipping, and it is in this adaptation of the apparatus to all hoofs that one of the principal merits of the apparatus consists, the support at the toe during the operation of paring being insured to large as well as small hoofs.

I do not claim the supporting of the horse's hoof by a stand during the shoeing operation; but What I do claim as new and of my own invention, and desire to secure by Letters Patent, is—

The herein-described head-piece C, with the adjustable slide $b$, constructed and arranged, substantially as set forth, for adapting the apparatus to hoofs of every size.

In testimony whereof I have hereunto signed my name before two subscribing witnesses.

NOAH WARLICK.

Witnesses:
W. F. MEADOR,
W. H. H. HUNTER.